United States Patent [19]

McConnell

[11] Patent Number: 4,576,501
[45] Date of Patent: Mar. 18, 1986

[54] TELESCOPING ROD CLAMP

[76] Inventor: Bernard E. McConnell, Rte. 2, Box 87, Greenville, Tex. 75401

[21] Appl. No.: 652,667

[22] Filed: Sep. 21, 1984

[51] Int. Cl.⁴ ............................................. F16B 7/10
[52] U.S. Cl. ...................... 403/59; 403/104; 403/109; 403/377; 248/413
[58] Field of Search ............ 403/109, 110, 377, 378, 403/104, 362, 59, 107; 248/413, 188.5, 354.5

[56] References Cited

U.S. PATENT DOCUMENTS

| 2,344,309 | 3/1944 | Koch | 403/104 X |
| 3,724,885 | 4/1973 | Becker | 403/104 |
| 3,955,828 | 5/1976 | Boudreau | 403/362 X |
| 4,111,575 | 9/1978 | Hoshino | 403/104 |
| 4,140,415 | 2/1979 | Koyamato | 403/104 |

FOREIGN PATENT DOCUMENTS 2127515 4/1984 United Kingdom ................ 403/377

Primary Examiner—Cornelius J. Husar
Assistant Examiner—Todd G. Williams
Attorney, Agent, or Firm—Glaser, Griggs & Schwartz

[57] ABSTRACT

A clamping or coupling apparatus for clamping an extension rod telescopically extendable from a tubular member includes two separate and independent clamping adjustments. The clamping apparatus is adapted to rotate freely relative to the tubular member, yet is prevented from axial movement relative to the tubular member. The extension rod is adapted to extend linearly relative to the clamping apparatus, but is prevented from rotating relative to the clamping apparatus. In this manner, a first clamping adjustment inhibits the axial movement of the extension rod relative to the clamping apparatus, so that the extension rod is prevented from axial movement and rotational movement relative to the clamping apparatus. A second clamping adjustment prevents the clamping apparatus from rotating relative to the tubular member. By selecting either of these clamping adjustments, the extension rod may (1) freely, linearly extend from the tubular member while being prevented from rotation relative to the tubular member or (2) freely rotate relative to the tubular member while maintaining constant a particular extension relative to the tubular member.

9 Claims, 7 Drawing Figures

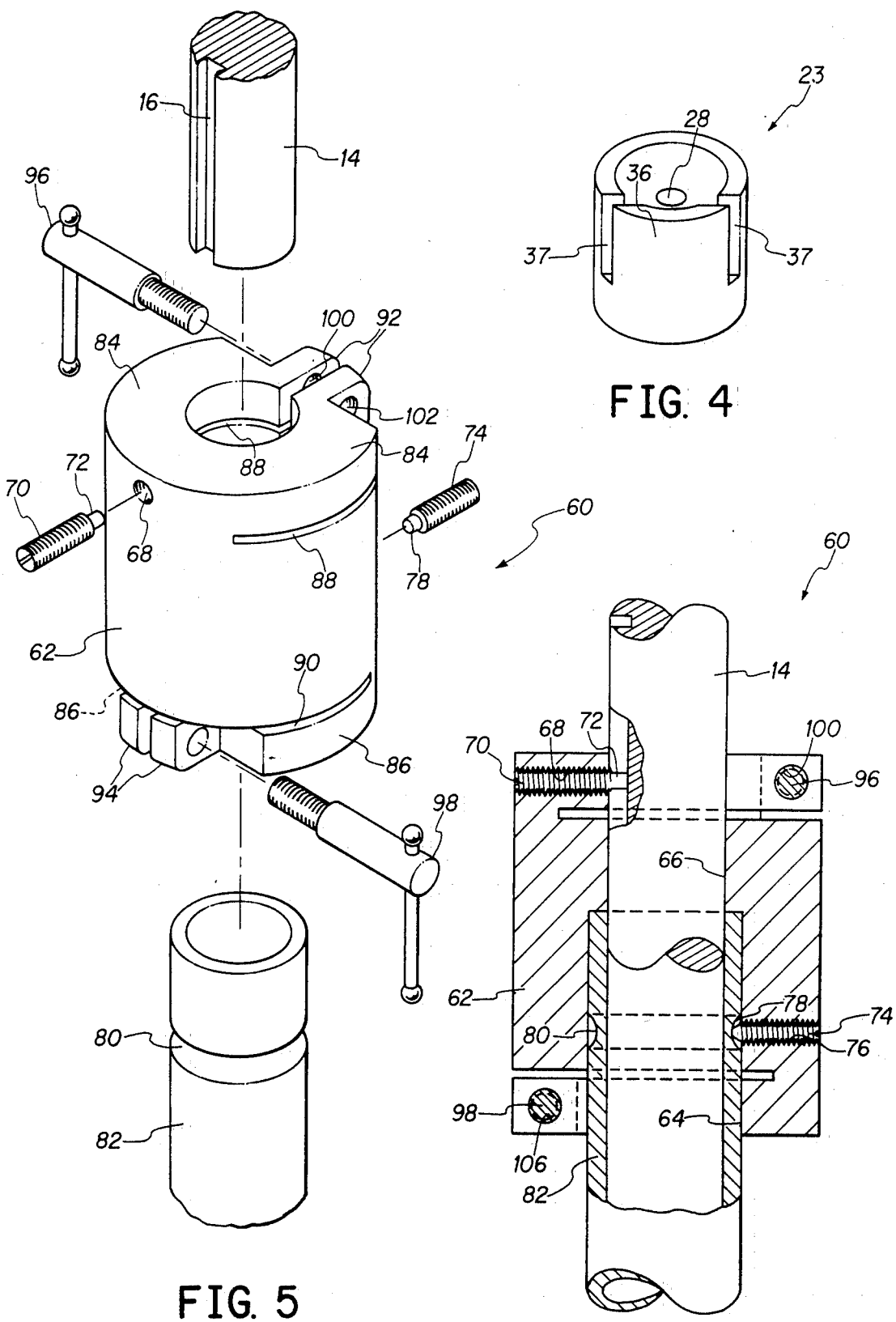

TELESCOPING ROD CLAMP

BACKGROUND OF THE INVENTION

This invention relates to clamps for clamping telescopically extendable rods relative to concentric tubular members from which the rods extend, and more particularly to a clamping device that selectively permits (1) telescopic extension of the extendable rod from the tubular member while simultaneously preventing rotation of the telescoping rod relative to the tubular member, (2) rotation of the telescoping rod relative to the tubular member while simultaneously preventing linear extension of the rod relative to the tubular member, or (3) selectively locks both the rotation and extension of the telescoping rod relative to the tubular member.

In order to maintain the linear adjustment of telescoping rods relative to the tubular members, circular compression collars having tapered threads have been utilized to compress split end sections of the tubular members against the telescopically extendable rod so that the friction force between the rod and slip end sections retains the rod in linear adjustment relative to the tubular member. This friction force between the two members additionally prevents the rod from rotating relative to the tubular member. This type of clamping device is suitable for most telescoping rod applications.

It becomes necessary at times, however, to adjust the linear extension of the telescoping rod relative to the tubular member while maintaining the rotational alignment of the two members constant (i.e., preventing rotation of the tube members during telescopic adjustment). Additionally, it is occasionally desirable to maintain the telescopic extension constant while permitting the extendable rod to rotate relative to the tubular member from one position to another. It is sometimes necessary to make these extension or rotation adjustments with one hand. Conventional tapered thread type telescopic extension clamps are incapable of permitting single handed adjustment, in that two hands are necessary to hold the tubular member while rotating the compression collar in either direction.

Accordingly, it is desirable to provide a clamping device for telescoping rod members which selectively permits (1) linear telescopic extension of the extension rod relative to the tubular portion while preventing rotation of the rod relative to the tubular member, and (2) rotation of the rod relative to the tubular member while preventing linear extension of the rod relative to the tubular member.

SUMMARY OF THE INVENTION

The present invention provides a clamping device for telescoping rod mechanisms adapted to clamp onto the end of the tubular member of the mechanism in such a manner that the clamp may freely rotate about the tubular member, yet is prevented from being removed from the end of the tubular member. The clamp includes a first tightening device for tightening the clamp relative to the tubular member to prevent rotational movement of the clamp relative to the tubular member. In the preferred embodiment, the clamping device includes a keying member for engaging an axially oriented open keyway in the telescoping rod for preventing rotation of the telescoping rod relative to the clamping device, while permitting extension movement. In an alternative embodiment, the means for preventing rotation of the telescoping rod relative to the clamping device takes the form of an elongate flat surface formed across an arc of the telescoping rod, which flat surface engages a mating flat surface formed on the inside diameter of a portion of the clamping device.

The clamping device further includes a second tightening device for tightening the telescoping rod relative to the clamping device to prevent linear extension of the rod relative to the clamping device. The first and second clamping devices operate independently of each other so that the extension rod can (1) extend linearly relative to the tubular member without rotation (2) rotate relative to the tubular member without extension, (3) extend linearly and rotate relative to the tubular member, and (4) neither extend linearly nor rotate relative to the tubular member.

BRIEF DESCRIPTION OF THE DRAWINGS

Specific features of the invention, as well as additional objects and advantages thereof, will become more readily understood by reference to the following detailed description taken in conjunction with the accompanying drawings, in which like reference numerals refer to corresponding parts, and in which:

FIG. 4 is a pictorial view of an alternative compression tongue collar which may be used in the clamping device of FIGS. 1-3;

FIG. 5 is a perspective view of an alternative embodiment of the clamping device of the present invention;

FIG. 6 is a vertical sectional view of the clamping device shown in FIG. 5, as assembled.

DETAILED DESCRIPTION OF THE INVENTION

Figure 1:
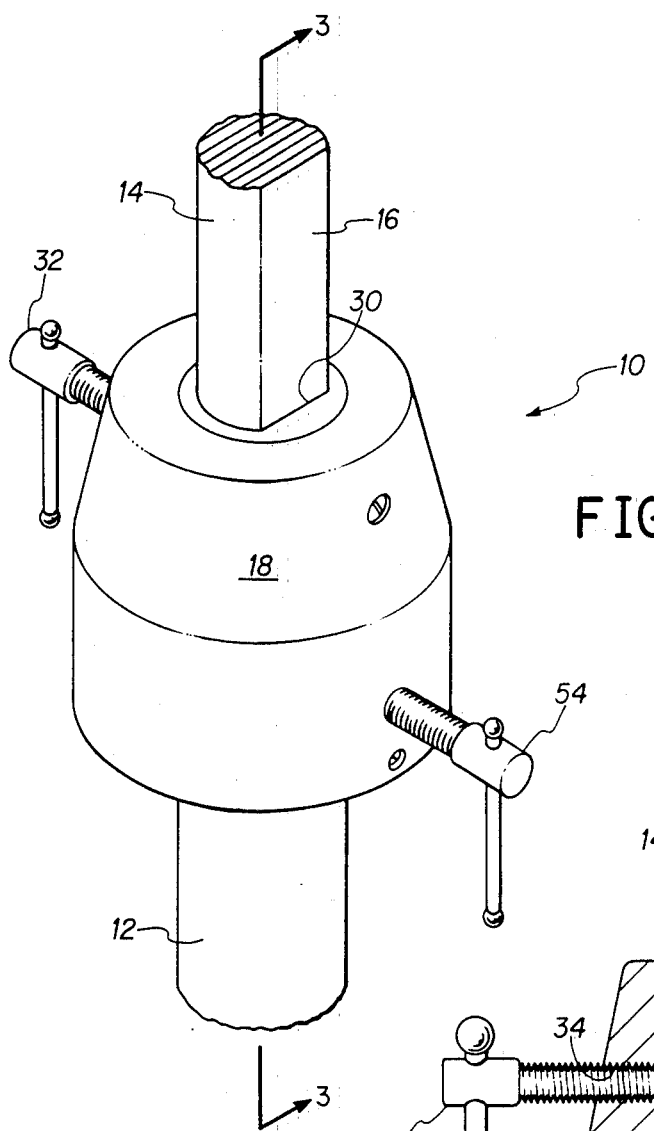
FIG. 1 is a perspective view of a preferred embodiment of the telescoping rod clamping device of the present invention.

Turning now to the drawings and initially to FIG. 1, a preferred embodiment of the telescoping rod clamp of the present invention is shown generally illustrated by the numeral 10. The clamp 10 is shown functionally attached to a tubular member 12 which has an extension rod 14 telescopically extendable therefrom. The rod 14 includes an axially oriented elongate flat section 16 which functions to maintain the extension rod non-rotatable relative to the clamp 10, as will be explained in greater detail hereinbelow.

Figure 2:
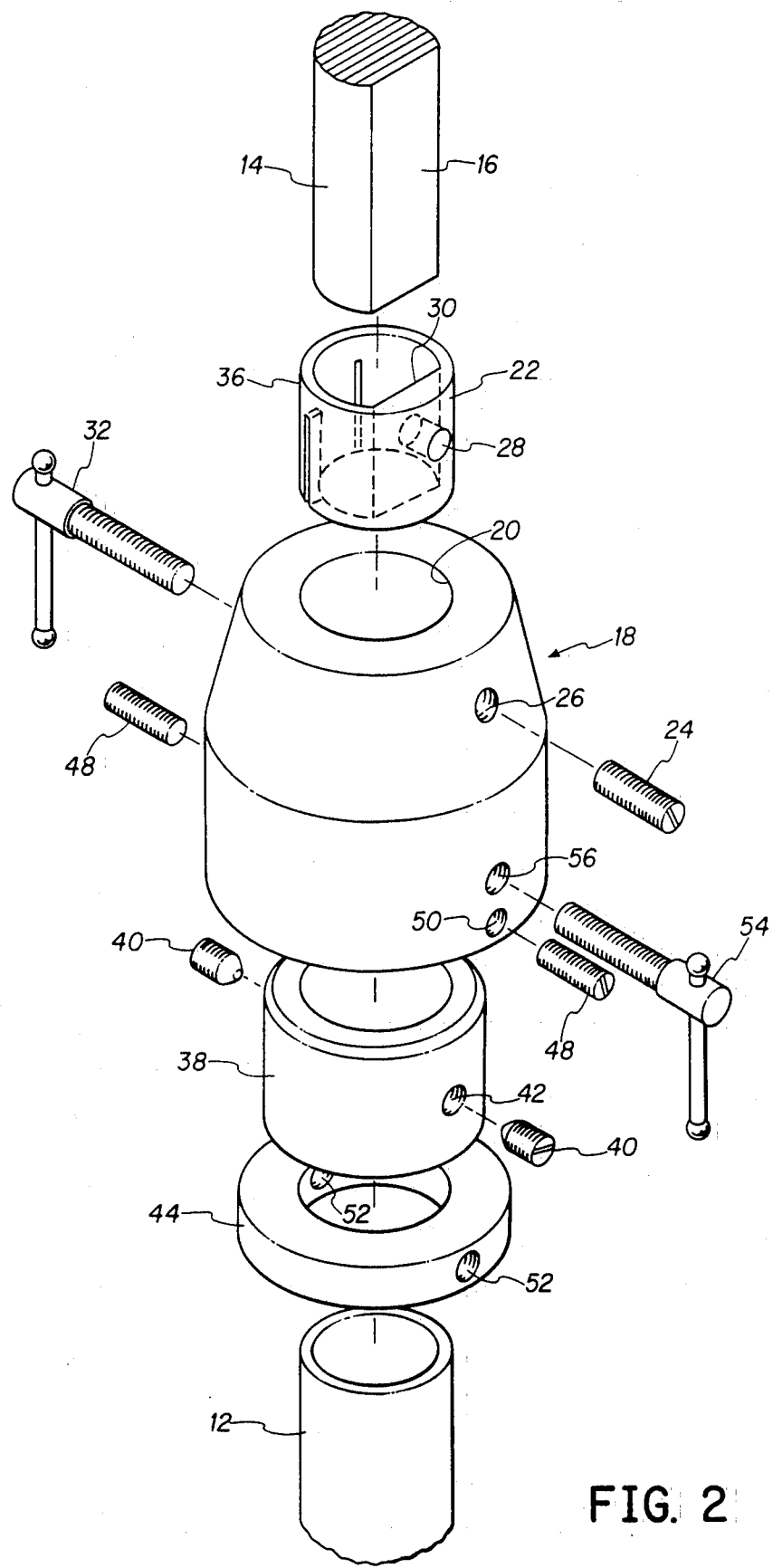
FIG. 2 is an exploded pictorial view of the pieces comprising the clamping device of FIG. 1.

Referring to FIG. 2, the telescoping rod clamp of the present invention comprises a main body member or housing 18, generally tubular in configuration and having a multi-stepped bore therethrough, with only a section of the bore 20 being visible in FIG. 2. The housing 18 is slightly tapered along the top portion thereof. A friction tongue collar 22 is adapted to be received within the section 20 of the multi-stepped bore. The extension rod 14, in turn, is slideably received within the friction tongue collar. With the collar 22 in functional position, set screw 24 threadedly engages the tapped hole 26 in the housing 18 and the tapped hole 28 in the collar 22. The collar 22 is formed with an internal axially oriented flat section 30 that engages the mating flat section 16 on the extension rod 14 to prevent the rod from rotating relative to the housing 18, yet permit the rod to be extended telescopically from the housing.

On the opposite side of the housing 18 from the tapped hole 26, a threaded shaft and handle mechanism 32 threadedly engages a tapped hole 34 (see FIG. 3) for engaging the tongue section 36 of the friction tongue collar 22. The tongue section 36 is sufficiently flexible such that when the threaded shaft 32 is threadedly inserted into the tapped hole 34 to engage the tongue section, the tongue section deflects to frictionally engage the extension rod 14 to prevent the rod from moving in the axial direction. In this manner, the extension rod 14 can be released and extended from the telescoping rod clamp 10, yet be prevented from rotating with respect to the rod clamp.

The tongue 36 is formed by cutting two longitudinally oriented slots 37 in the cylindrical surface of the collar sufficiently long to permit slight flexure of the tongue relative to the the collar cylindrical surface. These slots 37 may be of any conventional orientation and width sufficient to permit the tongue to deflect into frictional engagement with the extension rod.

Figure 3:
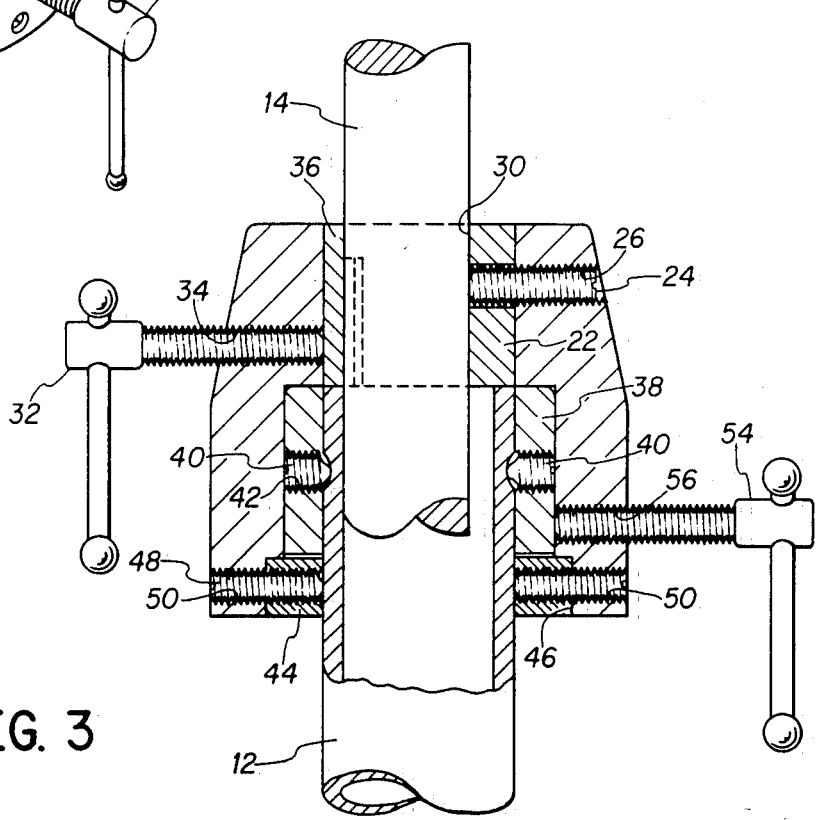
FIG. 3 is a vertical sectional view of the clamping device taken along lines 3—3 of FIG. 1.

Referring to FIGS. 2 and 3, a mounting sleeve 38 is adapted to attach to the upper end of the tubular member 12 in a manner that the housing 18 may fit concentrically therearound and rotate relative thereto. As shown in FIG. 3, the mounting sleeve 38 is attached to the tubular member 12 such that their upper annular surfaces are co-planar. The mounting sleeve is attached to the tubular member by set screws 40 that threadedly engage tapped holes 42 in the sleeve. As shown in FIG. 3, the set screws include slightly pointed ends that engage dimples in sidewall of the tubular member to retain the mounting sleeve thereon in a semi-permanent fashion. Set screws 40 are sufficiently shorter than the thickness of the mounting sleeve in order to avoid any interference caused when the housing 18 is positioned on the mounting sleeve.

Directly below the mounting sleeve 38 is positioned a retaining ring 44 for retaining the housing 18 in functional position about the tubular member and the mounting sleeve 38. As shown in FIGS. 2 and 3, the retaining ring 44 has an inside diameter slightly larger than the outside diameter of the tubular member 12, and has an outside diameter substantially equal to the largest diameter of the stepped bore of the housing, shown at 46. The retaining ring is held in functional position by set screws 48 which threadedly engage tapped holes 50, and also extend into the retaining ring to engage tapped holes 52 therein. As shown in FIG. 3, the set screws 48 have a flat rather than pointed end, and are sufficiently shorter than the combined radial thicknesses of the retaining ring 44 and the housing 18 at the stepped bore 46, in order that the set screws will not extend from the peripheral surface of the housing nor extend through the retaining ring to interfere with rotation of the retaining ring about the tubular member 12.

Those skilled in the art will readily appreciate that with the retaining ring 44 in functional position within the stepped bore 46, the housing 18 is secured to the mounting sleeve 38 and therefore to the tubular member 12 such that the housing may freely rotate about the mounting sleeve and tubular member, but will be prevented from axial movement relative to the tubular member.

A second threaded shaft and handle mechanism 54 threadedly engages a tapped hole 56 in the housing at a location to permit the end of the threaded shaft to frictionally engage the outer cylindrical surface of the mounting sleeve 38 (see FIG. 3). In this manner, the frictional engagement of the shaft against the mounting sleeve prevents rotation of the housing relative to the mounting sleeve and the tubular member.

ASSEMBLY AND OPERATION

Referring to FIGS. 2 and 3, the telescoping rod clamp 10 may be assembled in the following sequence. The retaining ring 44 is placed around the tubular member 12, followed by the mounting sleeve 38 directly on top of the retaining ring. Set screws 40 are then threadedly inserted into tapped holes 42 in the mounting sleeve, and tightened down against dimples in the outer surface of the tubular member 12 when the mounting sleeve 38 is positioned on the tubular member such that the upper annular surfaces of the tubular member and mounting sleeve are co-planar (see FIG. 3).

The friction tongue collar 22 may next be inserted into the small section of the multi-stepped bore 20, and the set screw 24 threadedly inserted through the tapped hole 26 and into the tapped hole 28 in the collar.

The housing 18 is then positioned about the mounting sleeve 38, and the retaining ring 44 fitted into the largest stepped bore diameter 46 of the housing. Set screws 48 are threadedly inserted through the tapped holes 50 and into the tapped holes 52 in the retaining ring to maintain the retaining ring in functional position such that the housing 18 may not be removed from the tubular member and mounting sleeve. The extension rod 14 may now be aligned with the inside diameter of the friction tongue collar 22 such that the elongate flat section 16 of the extension rod engages the mating flat section 30 of the collar 22 as the extension rod is inserted through the collar and concentrically into the tubular member 12.

With reference to FIG. 3, those skilled in the art will readily appreciate that tightening the threaded shaft 32 against the tongue 36 of the tongue collar 22 deflects the tongue into frictional engagement with the extension rod 14 to inhibit axial movement of the rod relative to the tubular member 12. In a like manner, tightening the threaded shaft 54 against the outer surface of the mounting sleeve 38 will inhibit rotation of the housing 18 relative to the tubular member 12. It should also be apparent that these two threaded shafts 32, 54 operate independently of one another so that it is possible to (1) adjust the extension of the rod relative to the tubular member while simultaneously preventing rotation of the rod relative to the tubular member, and (2) rotate the rod relative to the tubular member while maintaining constant the linear extension of the rod relative to the tubular member.

ALTERNATIVE EMBODIMENT

Turning now to FIGS. 5 and 6, an alternative embodiment of the telescoping rod clamp of the present invention is shown generally illustrated by the numeral 60. This telescoping rod clamp 60 comprises a main body member or housing 62 which is generally cylindrical in configuration. The housing 62 includes a stepped bore having a first larger diameter 64 and a second smaller diameter 66, essentially the same as the diameter of the extension rod 14. At its upper end, the housing 62 includes a tapped hole 68 through which a set screw 70 is threadedly inserted. The set screw 70 includes a keying tip 72 for keying the peripheral keyway 16 in the extension rod 14. A second set screw 74 threadedly engages a tapped hole 76 in the lower side of the housing 62 opposite the first set screw 70. This set screw 74 includes a rounded end portion 78 which is adapted to extend into an annular circumferential groove 80 formed in the tubular member 82. Those skilled in the art will appreciate that the rounded end 78 extending into the annular circumferential groove 80 will retain the housing 62 in position about the tubular member 82 and will prevent axial movement of the housing relative to the tubular member, while simultaneously permitting the housing to rotate freely about the tubular member.

The upper and lower ends of the housing 62 are formed with mating pairs of circumferential clamping wings 84, 86, respectively. These clamping wings are formed by respective slots 88, 90 formed in the housing adjacent the ends thereof. The wings include respective flanges 92, 94 that cooperative with respective threaded, shouldered shafts 96, 98 to compress the flanges together in order to clamp the wings against the extension rod and the tubular member, respectively. The threaded portion of the upper shouldered shaft 96 is adapted to pass through clearance hole 100 and threadedly engage tapped hole 102 in order to compress the clamping wing flanges 92 together. In a similar manner, the threaded portion of the lower shouldered shaft 98 is adapted to pass through clearance hole 104 and threadedly engage tapped hole 106 (see FIG. 5) in a manner to compress the lower clamping wing flanges 94 together to clamp against the tubular member 82.

ASSEMBLY AND OPERATION

With the set screw 74 removed (or at least partially withdrawn) from the housing 62, the housing is positioned upon the tubular member 82 in the customary manner. Subsequently, the set screw 74 is threadedly inserted into the tapped hole 76 sufficiently that the rounded end 78 extends into the annular circumferential groove 80 in the tubular member to prevent the housing from being removed from the tubular member. The extension rod 14 is then aligned with the keying tip 72 of the set screw 70 and inserted from the top into the housing 62 and into the tubular member 82.

Tightening the upper shouldered shaft 96 will cause the clamping wings 84 to circumferentially clamp about the extension rod 14 in a manner to prevent axial movement of the rod relative to the tubular member. Therefore, with only the upper shouldered shaft 96 tightened, the extension rod 14 is free to rotate relative to the tubular member while maintaining a specified extension relative to the tubular member. Additionally, it will be appreciated that tightening the lower shouldered shaft 98 will cause the clamping wings 86 to circumferentially clamp about the tubular member 82 in order to prevent rotational movement of the extendable rod relative to the tubular member. As in the preferred embodiment, these shouldered shafts 96, 98 function independently of one another in a manner to (1) permit axial movement of the extension rod relative to the tubular member while simultaneously retaining the axial rod in a particular rotational alignment, and (2) permit rotation of the extension rod relative to the tubular member while maintaining constant a particular axial extension of the rod relative to the tubular member.

FIRST MODIFICATION OF PREFERRED EMBODIMENT

FIG. 4 shows a modified design of a friction tongue collar 23 which may be used in a modified design of the preferred embodiment. The modified collar 23 also includes a tapped hole 28 and a pair of longitudinally oriented slots 37 defining the tongue 36, as in the embodiment shown in FIGS. 1-3. A set screw 74 is received in tapped hole 28 and engages the rod 14 inside of the flat 16. The collar is shown upside down for purposes of clarity. The collar 23 is formed of a relatively soft yet resilient material for at least three reasons: (1) the tongue section 39 is easily deflected into frictional engagement with the extension rod by a relatively small amount of force exerted by threaded shaft 32, (2) the tongue engages the rod across an area much larger than would be the engagement of the end of the threaded shaft and the rod, thereby contributing more frictional resistance to axial movement of the rod, and (3) a soft material will not scratch or mar the surface of the extension rod, thus inhibiting free axial movement of the rod.

SECOND MODIFICATION OF PREFERRED EMBODIMENT

Figure 7:
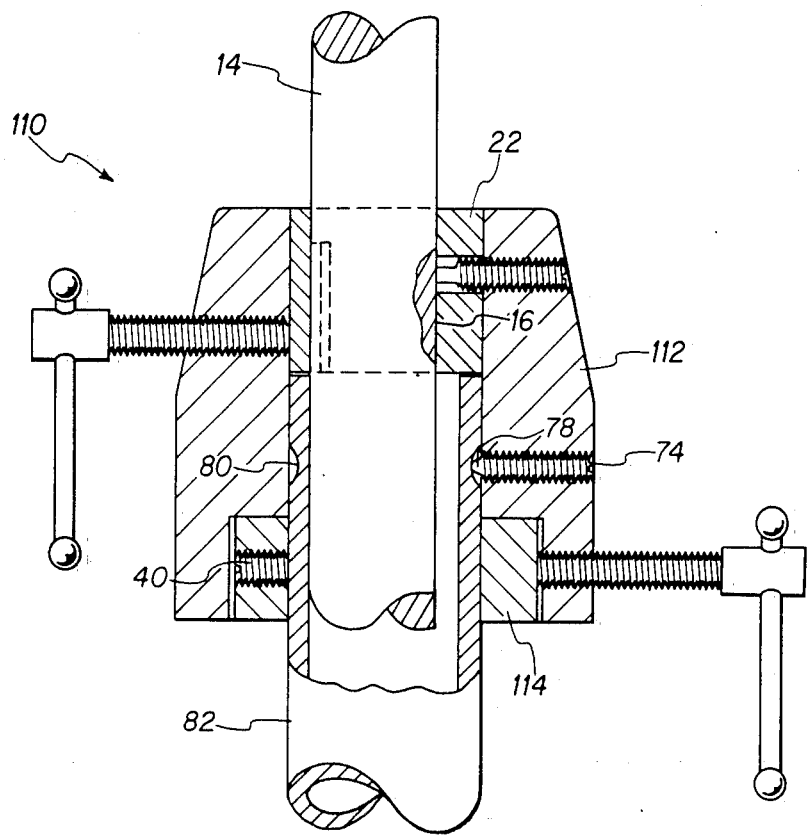
FIG. 7 is a vertical sectional view of an alternative design similar to that shown in FIG. 3.

FIG. 7 shows a second modified design of the preferred embodiment shown in FIGS. 1-3. This telescoping rod clamp 110 comprises a modified main body member or housing 112, generally tubular in configuration and having a stepped bore therethrough. The housing 112 is slightly tapered along the top portion thereof, as in the housing 18 of the preferred embodiment. This modified embodiment uses the extension rod 14 having an elongate flat surface 16 thereon, as in the preferred embodiment, in addition to, of course, the identical collar 22 used in the preferred embodiment. However, this alternative embodiment is used with a modified tubular member 82 having an annular circumferential groove 80 formed therein, as in the embodiments shown in FIGS. 5 and 6.

This alternative embodiment utilizes a separate breaking collar 114, which is semi-permanently attached to the tubular member 82 by a set screw 40, in a manner similar to the attachment of mounting sleeve 38 to the tubular member 12 of the preferred embodiment shown in FIGS. 1-3.

As in the embodiment of FIGS. 5 and 6, the housing 112 is retained in functional position about the tubular member 82 by a set screw 74 having a rounded end 78 thereon which rides in the annular circumferential groove 80 formed in the tubular member 82, in a manner to permit the housing 112 to freely rotate about the tubular member, yet prevent the housing 112 from being removed from the tubular member. In light of the assembly and operation of the previously described embodiments, the assembly and operation of this alternative embodiment should be readily apparent to those skilled in the art. Therefore, a detailed explanation of the assembly steps and operation is not considered necessary.

Those skilled in the art will readily appreciate that the overall arrangement of the clamping apparatus of the present invention has particular application in the instances wherein the axial extension and rotational position of a telescoping member relative to a tubular member are required to be controlled independently of one another. Although preferred and alternative embodiments of the present invention have been disclosed in detail herein, it will be understood that various substitutions and modifications may be made to the disclosed embodiments without departing from the scope and spirit of the present invention as recited in the appended claims.

What is claimed is:

1. Clamping apparatus for use with a tubular member having an extension member telescopically extendable therefrom, said apparatus for retaining said extension member in a fixed position relative to said tubular member, said apparatus comprising:
   a main body member having
      a first bore for receiving therein an end of said tubular member; and
      a second bore concentric with said first bore, the diameter of said second bore being less than the diameter of said first bore, said second bore for receiving telescopically therein said extension member;
   first means for attaching said body member to said tubular member in a manner to permit rotation of said body member relative to said tubular member, yet prevent removal of said body member from said tubular member;
   second means for preventing rotation of said extension member relative to said body member, yet permit telescopic extension of said extension member relative to said body member;
   third means for selectively preventing rotation of said body member relative to said tubular member, independent of axial movement of said extension member relative to said body member; and
   fourth means for selectively preventing axial movement of said extension member relative to said body member, independent of rotational movement of said body member relative to said tubular member.

2. The apparatus as set forth in claim 1, wherein said first means comprises an annular groove formed in said tubular member and pin means mounted with said body member for extending into said annular groove.

3. The apparatus as set forth in claim 1, wherein said second means comprises a longitudinal keyway formed in said extension member, and key means connected to said second bore in a manner to extend into said keyway.

4. The apparatus as set forth in claim 1, wherein said third means comprises a first circumferential clamping wing formed with said body member, said threaded shaft threadedly engaging said clamping wings and adapted to selectively clamp against said tubular member.

5. The apparatus as set forth in claim 1, wherein said fourth means comprises a second circumferential clamping wing formed with said body member and adapted to selectively clamp against said extension member.

6. The apparatus as set forth in claim 1, wherein said first means comprises:
   a first sleeve having an outside diameter slightly smaller than said first bore, and an inside diameter substantially equal to the outside diameter of said tubular member;
   a second sleeve having an outside diameter at least as great as the outside diameter of said first sleeve, the inside diameter of said second sleeve being slightly larger than the outside diameter of said tubular member, said second sleeve being adapted to attach to said body member and enclose said first sleeve to thereby lock said body member onto said tubular member in a manner to permit rotation of said body member relative to said tubular member; and,
   a third sleeve having an outside diameter substantially equal to the inside diameter of said second bore and an inside diameter substantially equal to the outside diameter of said extension member, and said third sleeve adapted to attach within said second bore.

7. The apparatus as set forth in claim 6, wherein said second means comprises a longitudinal keyway formed in said extension member, and key means connected to said third sleeve in a manner to extend into said keyway.

8. The apparatus as set forth in claim 6, wherein said third means comprises a threaded shaft threadedly engaging said main body member and adapted to selectively engage said first sleeve.

9. The apparatus as set forth in claim 6, wherein said fourth means comprises a threaded shaft threadedly engaging said body member and adapted to selectively engage said third sleeve.

* * * * *